J. SCHMIDT.
VALVE CAP.
APPLICATION FILED MAY 28, 1920.
1,374,396.
Patented Apr. 12, 1921.
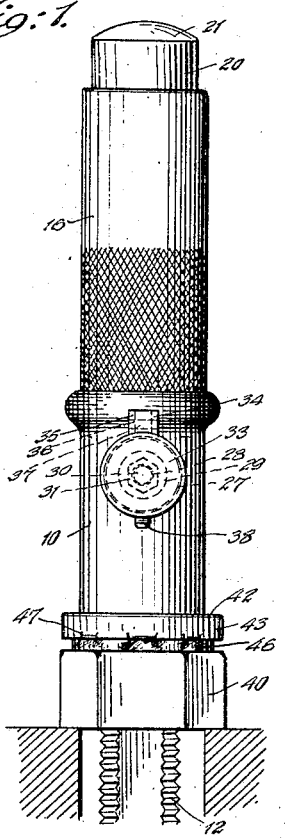
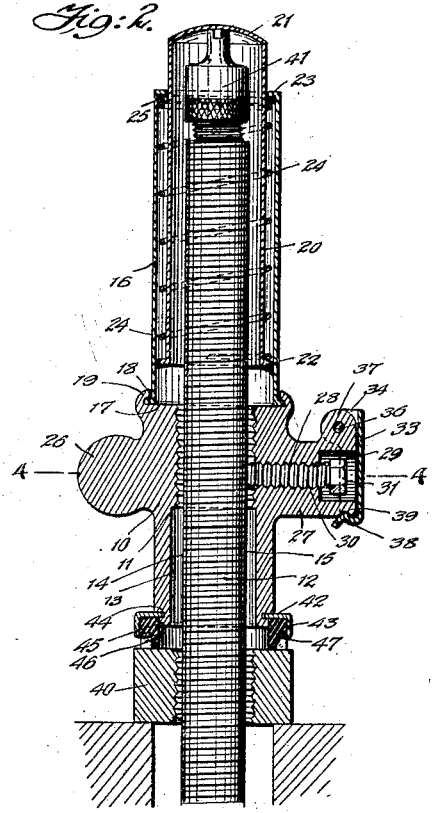
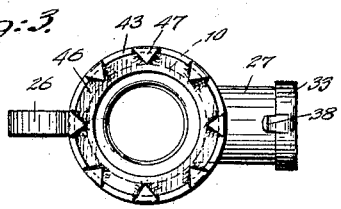
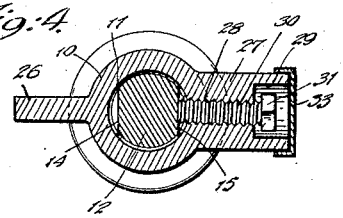
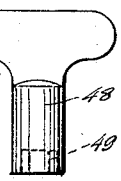
Inventor
John Schmidt
By his Attorney

UNITED STATES PATENT OFFICE.

JOHN SCHMIDT, OF NEW YORK, N. Y.

VALVE-CAP.

1,374,396.  Specification of Letters Patent.  Patented Apr. 12, 1921.

Application filed May 28, 1920. Serial No. 384,816.

*To all whom it may concern:*

Be it known that I, JOHN SCHMIDT, a citizen of Jugo-Slavia, and a resident of the borough of Bronx, in the city, county, and State of New York, have invented certain new and useful Improvements in Valve-Caps, of which the following is a description.

The present invention relates to improvements in valve caps, particularly for use upon the valves of pneumatic tires or other inflatable structures.

An object of the invention is to provide a valve cap which will furnish a thoroughly tight and protective cover for valves, will be dust and moisture proof, and may be locked in place so that it cannot become accidentally loosened or removed by unauthorized persons.

A further object is to provide a cap which will be extensible and adjustable to fit valves of different lengths, and which will entirely cover the exposed portion of the valve stem, seating firmly upon the bushing or other structure surrounding the stem at its base, and to this latter end I propose to provide a novel form of swivel washer adapted, as pressure is applied, to engage the seating surface with a closely adhering gripping contact.

With these and other objects in view, an embodiment of my invention is shown in the accompanying drawings, and this embodiment will be hereinafter more fully described with reference thereto, and the invention will be finally pointed out in the claims.

In the accompanying drawings:

Figure 1 is a side elevation of my improved cap, attached to the valve stem of the valve of a pneumatic tire, and showing a portion of the wheel felly in section.

Fig. 2 is a vertical sectional view of the cap showing the same in place upon the valve stem.

Fig. 3 is a bottom plan view of the cap.

Fig. 4 is a horizontal sectional view taken along the line 4—4 of Fig. 2, and,

Fig. 5 is a detail view showing the key used in connection with the valve cap.

Similar reference characters indicate corresponding parts throughout the several figures of the drawings.

Referring to the drawings, the embodiment of my invention therein comprises a main body portion 10, tubular in form, and provided at its upper portion with screw threads 11, adapted to engage the threaded portion of the stem 12 of the valve, the bore of the portion 10 below the screw threads being of greater diameter than the screw threaded portion, as at 13, to provide an entrance portion to enable the cap to be placed squarely upon the stem before turning, thus permitting a positive and accurate engagement of the threads. The valve stem is of a well known type, provided with flat surfaces 14 and 15, extending longitudinally and along opposite sides to enable it to be engaged by a wrench without mutilating the threads, and it may be here remarked that this feature of the stem is used in coöperation with the locking means provided in my improvements. A tubular extension 16 is mounted upon the upper end of the portion 10 in a recess 17, being outwardly flanged at its lower end, as at 18, and secured beneath the bent over rim 19 surrounding the recess, and within the extension 16 there is provided a tubular cap member 20, closed at its upper end, as at 21, and provided at its lower end with an outwardly bent flange 22 spacing its outer wall from the inner wall of the tubular member 16, and between the flange 22 and an inwardly bent flange 23 at the upper end of the tubular member 16 there is disposed a helical spring 24 adapted to normally hold the tubular cap member retracted within the tubular member 16, and with its flange 22 seating in the recess 17. A packing ring 25 of leather or other suitable substance, is interposed between the upper end of the spring, which is bent into a flat horizontal plane, and the flange 23, to provide an air-tight closure for the cap, and at the same time to enable the easy sliding movement of the tubular cap member within the tubular member 16.

An enlargement 26 is formed upon the portion 10 of the cap to provide a suitable lug or knob to facilitate turning, and preferably diametrically opposite thereto to incidentally assist in the turning action, there is provided an enlargement 27, having a threaded hole 28 therein, extending laterally and surrounded at its outer end by an annular recess 29. A set screw 30 is screwed into the threaded hole, and is provided with a hexagonal head 31 disposed in the recess 29, the screw adapted to be turned into engagement with one or the other flat surfaces 14 and 15 of the valve stem to securely lock the cap thereon.

A circular rimmed dust cap 33 is provided over the end of the enlargement 27 to prevent dust from entering the recess 29, being provided at its upper portion with extensions 34 and 35 bent therefrom, a pin 36 connecting the same to a lug 37 formed upon the upper side of the enlargement, and forming a hinge for the cap. At the lower portion of the cap there is provided a spring piece 38 adapted to snap into engagement with a recess 39 to yieldingly hold the dust cap in place, and at the same time to provide a convenient finger hold to enable the cap to be conveniently raised.

It is understood that when the cap is screwed upon the valve stem it may be fully engaged therewith, so that its base rests upon the nut 40, provided upon the valve stem, and screwed tightly against the wheel felly, the closure cap 41 at the end of the valve stem engaging the closed end 21 of the extensible tubular cap member 20, and projecting it relatively to the tubular member 16, so that the valve cap will accommodate any of the usual lengths of valve stems, and at the same time will entirely cover the same. The nut 40 may also, if desired, be dispensed with, the cap engaging directly upon the felly and serving the function of the nut.

In order to provide a tight closure between the lower end of the cap and the nut 40, there is provided upon the end of the cap a swivel washer, consisting of a laterally extending ring 42, having a downwardly bent flange portion 43 at its outer edge, its inner edge being rotatably engaged in an annular groove 44 provided near the lower end of the member 10, and formed by bending the lower end of the said member 10 outwardly, as at 45, to engage the inner side of the ring 42 and thereby hold the same in place. Within the flange 43, engaged at its inner surface by the outwardly bent portion 45 of the member 10, and at its upper surface by the upper portion 42 of the ring, there is provided a washer 46 projecting substantially below the lower edge of the flange 43, preferably formed of rubber composition or some other suitable yieldable substance. A plurality of prongs 47 project from the lower edge of the flange 43, and are adapted to be bent inwardly in substantially flush relation with the edge of the flange, as shown in Fig. 2, compressing those portions of the lower surface of the washer engaged thereby, so that they are drawn into recessed relation to the bottom surface of the washer, the prongs terminating, however, outwardly of the inner cylindrical surface of the washer, so that a continuous flat inner surface remains inwardly of the prongs for engagement with the nut 40 or other seating surface provided at the lower end of the stem 12. The ring and washer may swivel freely with relation to the member 10. The manner of attachment of the washer within the ring securely holds the same against loss, and the provision of the continuous flat surface inwardly of the prongs for engagement with the seating surface and the spaced recesses formed by the prongs, provides a structure adapted to yieldably and very snugly engage the seating surface as the washer is compressed by turning down of the cap.

In Fig. 5 I have shown a key 48 provided at one end with a hexagonal shaped socket 49, adapted to be engaged with the head of the set screw 30 to tighten or loosen the same relatively to the valve stem, it being understood that when the same is tightened into engagement with one of the flat surfaces thereof, that the cap is locked in place, and that when it is desired to remove the cap, the set screw is turned outwardly, so that it is freed from the stem, and thereby the cap may be turned off of the stem.

I have illustrated and described a preferred and satisfactory embodiment of my invention, but it is obvious that changes may be made therein within the spirit and scope thereof, as defined in the appended claims.

I claim:

1. A valve cap comprising a tubular body portion, means closing one end thereof, said tubular body portion being provided interiorly with screw threads to engage a screw threaded valve stem, and a washer swivelly mounted at the other end of said body portion, and comprising an annular flanged ring swivelly connected to the end of said body portion, a yieldable gasket disposed within said flanged ring, and projecting from the lower extremity thereof, and prongs provided upon the lower extremity of said flanged ring bent inwardly to grip said gasket and compress those portions of the said gasket engaged thereby below the exposed lower surface of said gasket, said prongs terminating outwardly of the inner periphery of said gasket, whereby to leave the inner lower portion of the gasket unrestrained and projecting.

2. A valve cap comprising a tubular body portion provided at one end with a recess, and interiorly threaded to engage a screw threaded valve stem, a tubular extension secured at one end in said recess, provided at its other end with an inwardly extending flange, a tubular cap member disposed within said tubular extension, having its outer wall spaced from the inner wall of said tubular extension, provided at its lower end with an outwardly extending flange, a helical spring disposed in the recess between said members and respectively engaging said flanges of said members at its ends to normally hold said tubular cap member in retracted position, said tubular cap member adapted to seat in said recess in said retracted position, said tubular cap member adapted to be projected relative to said tubular extension member.

3. A valve cap comprising a tubular body portion provided at one end with a recess, and interiorly threaded to engage a screw threaded valve stem, a tubular extension secured at one end in said recess, a tubular cap member disposed within said tubular extension, having its outer wall spaced from the inner wall of the tubular extension, means to guide the cap member within the tubular extension and acting to maintain the spaced relation between these two parts, spring means disposed in the space between the cap member and tubular extension and engaging said means, said spring means normally holding said tubular cap in retracted position, said tubular cap member adapted to be projected relative to said tubular extension.

In testimony that I claim the foregoing as my invention, I have signed my name.

JOHN SCHMIDT.